Aug. 13, 1946.  R. H. GODDARD  2,405,785
COMBUSTION CHAMBER
Filed March 14, 1944  3 Sheets-Sheet 1

INVENTOR.
Robert H. Goddard
BY ATTORNEY
Chas. T. Hawley

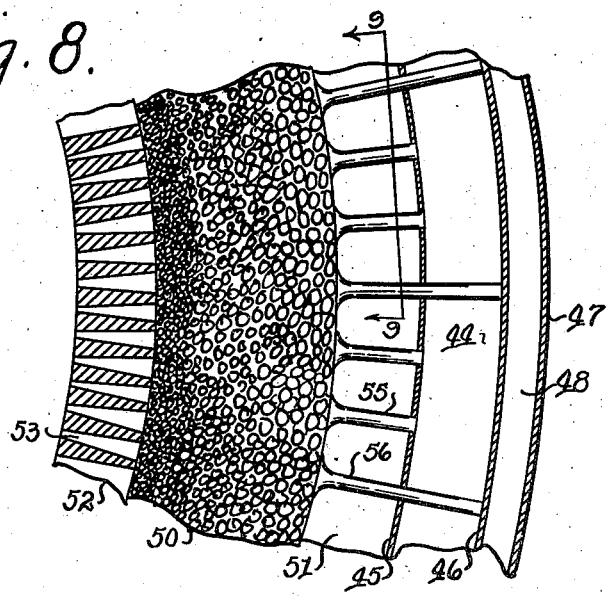
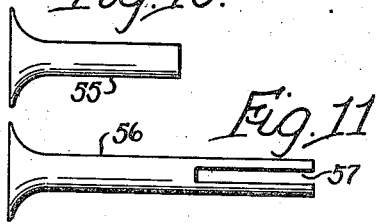
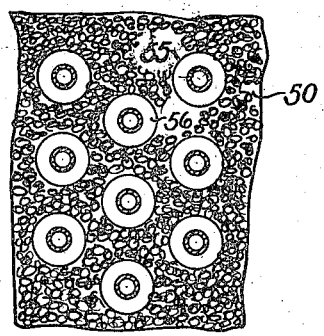
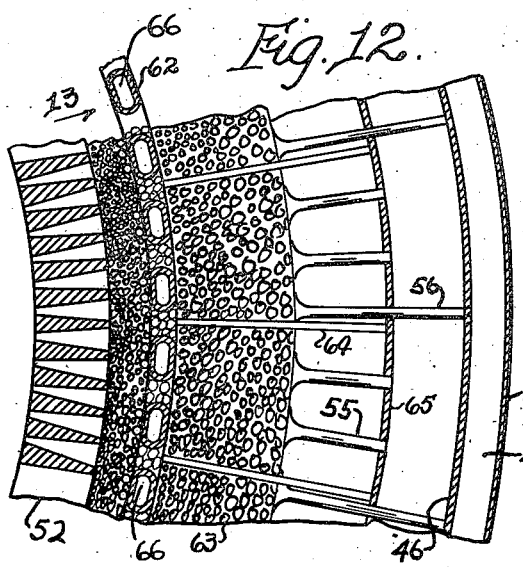
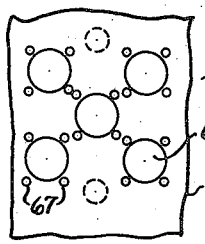

Aug. 13, 1946.  R. H. GODDARD  2,405,785
COMBUSTION CHAMBER
Filed March 14, 1944  3 Sheets-Sheet 3
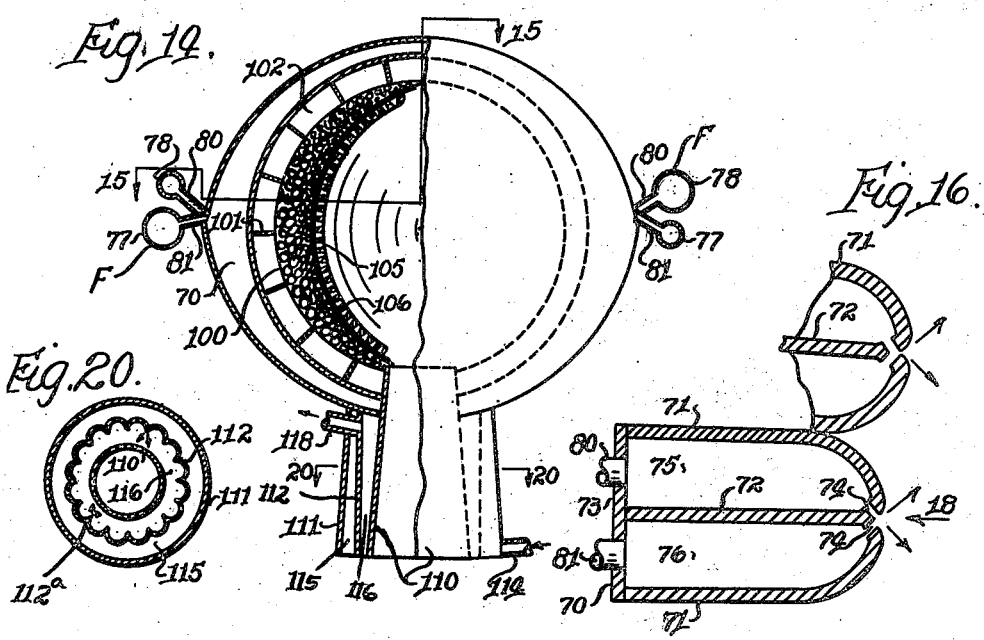
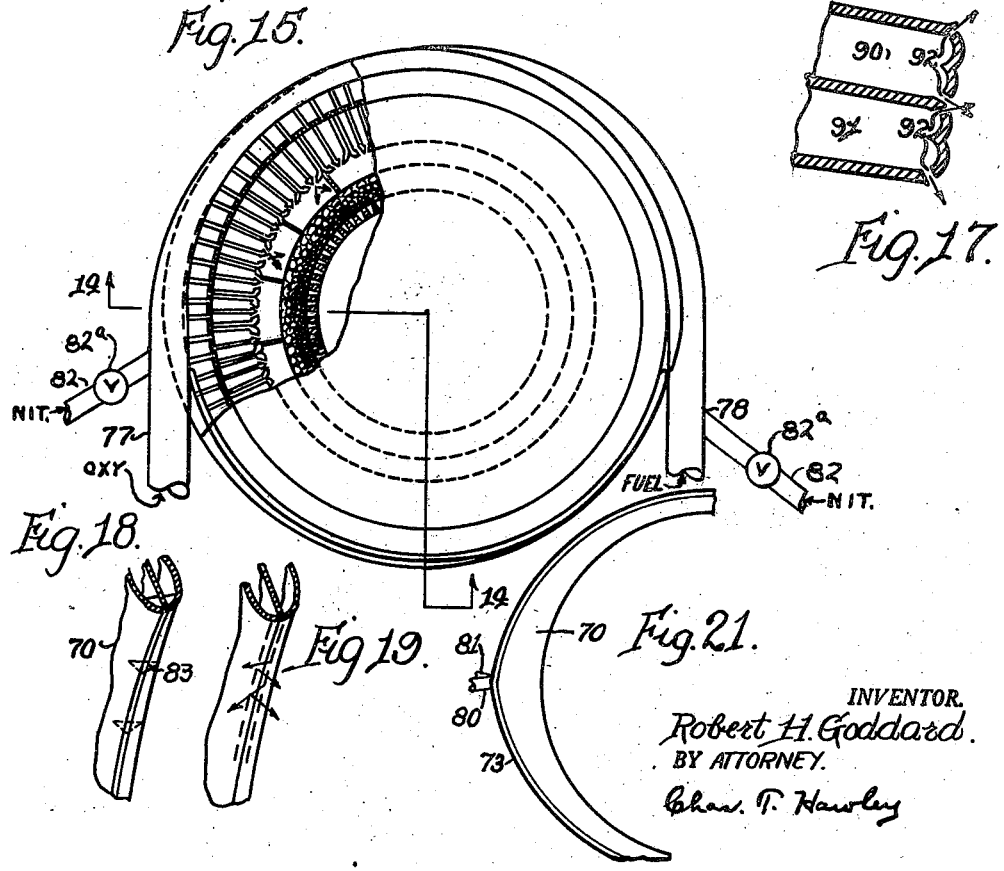
INVENTOR.
Robert H. Goddard.
BY ATTORNEY.
Chas. T. Hawley Patented Aug. 13, 1946

2,405,785

UNITED STATES PATENT OFFICE 2,405,785

COMBUSTION CHAMBER

Robert H. Goddard, Annapolis, Md.; Esther C. Goddard, executrix of said Robert H. Goddard, deceased, assignor of one-half to The Daniel and Florence Guggenheim Foundation, New York, N. Y., a corporation of New York Application March 14, 1944, Serial No. 526,422

17 Claims. (Cl. 60—44)

This invention relates to a combustion chamber to which a mixture of combustible and oxidizing liquids is fed and in which the mixture is consumed. Very complete intermingling of such liquids is essential to efficient operation.

A type of wall which is designed for use in such combustion chambers is shown in my prior Patent No. 2,396,567, issued March 12, 1946.

It is the general object of my present invention to improve the construction shown in said prior application, to the end that more complete and satisfactory intermingling of the liquids may be attained.

More specifically, I provide a channeled or porous wall portion for a combustion chamber, which wall portion is preferably formed of a metal having good heat conductivity. A further feature of my invention relates to the provision of a wall portion in which the channels or pores are larger and in which the material is more open at the outer or more remote side of said wall portion, as compared with the side nearer the combustion chamber.

My improved construction is very effective in preventing flash-back or premature ignition of the highly explosive liquid mixture. I also provide improved means for protecting the inner face of the chamber wall from the very high temperatures prevailing in such combustion chambers.

Another feature of my invention relates to the provision of a combustion chamber having its enclosing wall formed of assembled lune-shaped elements. I have also shown an improved cooling jacket construction for the combustion chamber nozzle.

Preferred forms of my invention are shown in the drawings, in which

Fig. 2 is a partial sectional plan view showing a modified construction of certain features;

Fig. 8 is a partial sectional plan view of a modified form of combustion chamber wall;

Fig. 9 is a fragmentary sectional side view, taken along the line 9—9 in Fig. 8;

Fig. 10 is a side view of a short form of feed tube;

Fig. 11 is a similar view of a longer type of tube;

Fig. 12 is a partial sectional plan view of a further modified wall construction;

Fig. 13 is a fragmentary side elevation, looking in the direction of the arrow 13 in Fig. 12;

Fig. 14 is a front elevation of a combustion chamber, partly in section along the line 14—14 in Fig. 15 and showing one application of my invention;

Fig. 15 is a plan view of the combustion chamber shown in Fig. 14, partly in section along the line 15—15 in said figure;

Fig. 16 is an enlarged sectional plan view of adjacent feeding compartments of the combustion chamber shown in Fig. 14;

Fig. 17 is a similar view of a modified construction;

Fig. 18 is a partial perspective view of the inner edge portion of one of the feeding compartment elements, looking in the general direction of the arrow 18 in Fig. 16;

Fig. 19 is a similar view of a slight modification;

Fig. 20 is a sectional plan view, taken along the line 20—20 in Fig. 14; and

Fig. 21 is a side elevation of a lune-shaped feeding compartment element.

Figure 1:
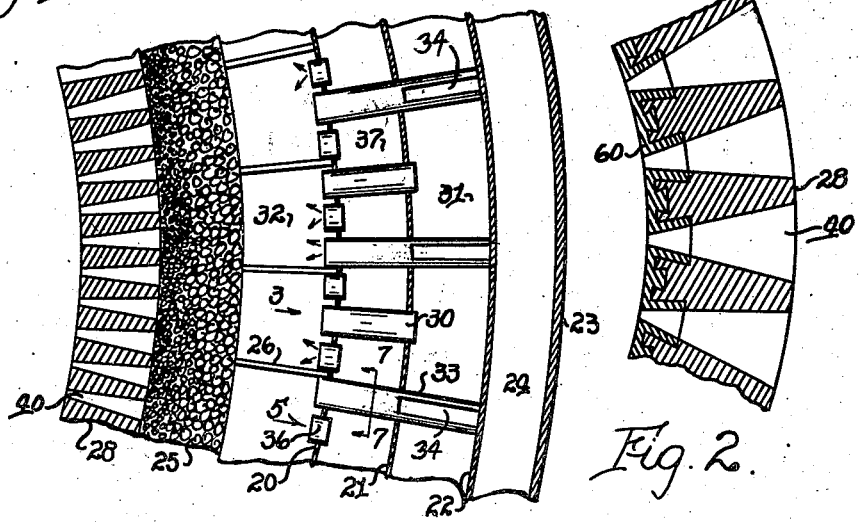
Fig. 1 is a sectional plan view of a portion of a combustion chamber wall embodying my improvements.

Referring to Figs. 1 to 7, I have shown a portion of a combustion chamber wall having novel features adapted for use in the combustion chamber shown in Figs. 14 and 15 or in other combustion chambers of the general type shown in my prior Patent No. 2,183,313, issued to me December 12, 1939.

My improved combustion chamber wall comprises a series of casing members 20, 21 and 22 which are either concentric in a spherical or cylindrical combustion chamber or uniformly spaced apart in other chamber sections. An outer casing or jacket 23 preferably encloses the combustion chamber and provides a jacket space 24.

A porous wall 25 is positioned within the inner casing member 20 and is secured thereto and spaced therefrom by braces or tie rods 26. An additional inner wall is secured inside of the wall 25 and forms the inner lining 28 of the combustion chamber.

Feed tubes 30 connect the space 31 between the casing members 21 and 22 to the mixing space 32 between the casing member 20 and the porous wall 25. Additional long tubes 33 connect the same spaces 31 and 32 and also act as braces for the outer casing member 22. These long tubes 33 may be welded at their outer ends to the inner surface of the casing member 22 and are provided with side slots 34 (Fig. 4) to permit entrance of liquid to the feed tubes.

Figure 6:
Fig. 6 is a sectional view, taken along the line 6—6 in Fig. 5.
Figure 3:
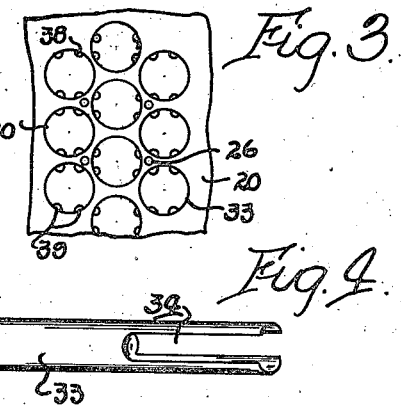
Fig. 3 is a fragmentary side elevation, looking in the direction of the arrow 3 in Fig. 1.
Figure 5:
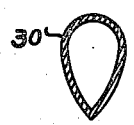
Fig. 5 is an end view of a short feed tube, looking in the direction of the arrow 5 in Fig. 1.
Figure 4:
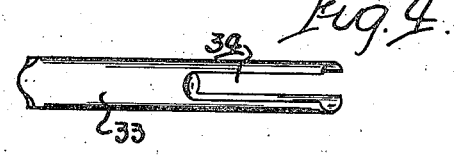
Fig. 4 is a perspective view of one form of feed tube.
Figure 7:
Fig. 7 is a detail sectional view, taken along the line 7—7 in Fig. 1.

Very short feed tubes 36 are inserted in the inner casing member 20 and connect the space 37 between the casing members 20 and 21 with the space 32 between the casing member 20 and the porous wall 25. Each of the tubes 30, 33 and 36 are formed at their inner ends as indicated in Figs. 5 and 6, with pairs of feed openings 38 and 39.

The porous wall 25 is formed of small fragments of some metal such as copper or aluminum having good heat-conducting qualities. These fragments are sintered together to provide a fairly rigid metallic porous structure. The metal fragments are preferably graduated in size, with the larger fragments and consequently the larger channels or pores at the outer side of the wall or toward the wall space 32, and the smaller fragments and finer pores in the inner part of the wall or toward the lining 28.

The lining 28 is also of a metal having good heat-conducting properties and is provided with many inwardly contracted conical openings or passages 40, which are preferably radial to a spherical or cylindrical inner surface or perpendicular to a flat inner surface.

Any suitable supply means may be provided for feeding a combustible liquid such as propane to the space 37 between the casing members 20 and 21 and for feeding liquid oxygen to the space 31 between the casing members 21 and 22 and also to the jacket space 24. The propane then advances through the short tubes 36 to the space 32, and the liquid oxygen feeds through the tubes 30 and 33 to the space 32, both liquids being delivered in the form of sprays through pairs of openings 38 and 39.

As the usual proportions of fuel and oxidizing elements are approximately 1 to 2, it is desirable that the spray openings in the tubes 30 and 33 be correspondingly larger than the openings in the short tubes 36 or that proportionately more of the tubes 30 and 33 be provided.

The liquid oxygen in the jacket space 24 is not fed directly to the combustion chamber but is used to maintain the whole chamber wall at a very low temperature, so that possible gas bind in the porous wall 25 or inner lining 28 may be avoided. The tubes 30 and 33 are preferably of the streamlined section shown in Fig. 7 to facilitate free flow of liquids circumferentially in the spaces 31 and 37.

The advantages of my improved chamber wall will be readily apparent. Fuel and oxidizing liquid are fed simultaneously to the space 32 in the form of sprays which are directed toward each other so that the liquids are closely intermingled in the space 32. The mixed liquids then enter the channels or pores of the porous wall 25, which channels or pores become finer along the path of flow of the liquids, with correspondingly more effective and intimate intermingling of the liquids. As the mixed liquids emerge into the conical passages 40 in the lining 28 they are in the form of very fine sprays and are very thoroughly intermingled.

As the liquid mixture moves through the passages 40, the rate of flow of the mixture is substantially increased as the cross section of the passages decreases, so that the intimate mixture of liquids issues from the passages 40 at relatively high speed and in condition for immediate and complete combustion within very short travel. Such immediate combustion is desirable, as it permits a reduction in the size of the combustion chamber.

The mixture of liquids in the space 32, in the porous wall 25 and in the passages 40 is increasingly explosive, but flash-back and explosion is effectively prevented by the high rate of delivery of the mixture from the passages 40 and by the safety screen of the porous wall 25, together with the good heat conductivity of the metal walls 25 and 28. Vaporization of the liquids may occur in the passages 40 and also in the inner and finer portion of the porous wall 25. Complete and rapid combustion will be thereby facilitated.

In Figs. 8 to 11 I have shown a modified construction of chamber wall in which a space 44 is provided between casing members 45 and 46, and in which a jacket 47 encloses a jacket space 48. A porous wall 50 is separated from the casing member 45 by a space 51 supplied with liquid fuel. An inner wall 52 corresponds to the lining 28 previously described and is similarly provided with conical passages 53.

Short tubes 55 and long tubes 56 connect the oxygen space 44 to the porous wall 50, the long tubes being slotted as indicated at 57 (Fig. 11) and functioning as previously described. The short tubes 55 and the long tubes 56 are all provided with enlarged inner ends, as shown in Figs. 10 and 11, and these enlarged inner ends are brazed or otherwise firmly secured to the outer surface of the metal porous wall 50.

Liquid oxygen is fed to the porous wall 50 through the tubes 55 and 56, and the liquid fuel is fed directly to the porous wall through the surface portions not covered by the enlarged inner ends of the tubes 55 and 56. As the two mixtures are not sprayed together as in the construction shown in Fig. 1, the entire mixing must take place in the porous wall 50 which is of correspondingly increased thickness.

The life of the metal inner wall or lining 28 or 52 may be prolonged by providing a vitreous or other fire-resistant facing 60 (Fig. 2) which may be dove-tailed and rabbeted to the wall or lining in such manner that it will be effectively retained.

The construction shown in Figs. 12 and 13 is similar to that shown in Figs. 8 and 9, except that a double-walled hollow plate-like member 62 is molded or otherwise inserted in the porous wall 63 and is preferably secured by tie rods 64 to the casing member 65. The hollow member 62 is provided with relatively large openings 66 for the passage of the intermingled liquids, and is also provided with relatively small feed openings or perforations 67 (Fig. 13) adjacent the openings 66 but extending through that portion only of the double wall which is nearer the combustion chamber or at the left in Fig. 12. The space between the double walls of the member 62 is to be supplied with liquid oxygen from any convenient source, which oxygen will then be fed into the liquid mixture flowing through the openings 67.

With this construction, the proportion of oxygen in the mixture delivered to the porous wall 63 may be reduced, with corresponding reduction of its explosive qualities, and the additional oxygen required for satisfactory combustion may be added through the perforations or openings 67.

By controlling the supply of oxygen thus supplied through the openings 67, the quality of the final mixture may be conveniently and accurately controlled.

In Figs. 14 to 19, I have shown a novel type of combustion chamber in which my improved porous chamber wall may be effectively utilized. In this construction, the outer portion of the combustion chamber is formed of a large number of lune-shaped elements 70 (Fig. 21) assembled and secured in closely abutted relation. Two of these elements are shown in section in Fig. 16 and each element comprises outer side walls 71 and an inner lengthwise partition 72, together with an outer end wall 73. At their inner ends, the walls 71 are curved toward the middle so that their edges are closely adjacent the inner end of the middle partition 72, thus providing narrow longitudinal feed slots 74. The partitions 71 and 72 enclose a compartment 75 for liquid fuel and a compartment 76 for liquid oxygen. The liquid fuel and liquid oxygen are forced through the narrow longitudinal ports 74 to form an intermingled spray, as clearly shown in Fig. 16.

Horizontally disposed supply pipes 77 and 78 (Figs. 14 and 15) substantially encircle the combustion chamber, and each pipe is gradually reduced in cross section toward its closed end, so that the supply of liquids to all portions of the combustion chamber may be maintained substantially uniform. Each fuel compartment 75 is connected by a short tube 80 to the fuel feed pipe 78, and each oxygen compartment 76 is connected by a short tube 81 to the oxygen feed pipe 77. Branch pipes 82 controlled by shut-off valves 82a supply liquid nitrogen for a purpose to be described.

In Fig. 18 I have shown a perspective view of a portion of the slotted inner edge of a lune-shaped portion 70 and have also shown a series of small flat triangular braces 83 by which the side and central partitions are securely held in spaced relation without substantially obstructing the longitudinal slots or spray openings. In Fig. 19 a similar construction is shown, except that the spray openings or slots are not continuous, so that the braces 83 may be omitted.

In Fig. 17 I have shown a further modification, in which adjacent lune-shaped compartments 90 and 91 are each provided with two delivery slots 92, so that twice the number of intermingled sprays will be delivered.

A lune-shaped porous wall 100 of sintered metal fragments is mounted within the assembled supply elements 70 and is spaced therefrom by supports 101, thus leaving an air space 102 in which the two liquids may be intermingled as previously described with reference to Fig. 1. The sprayed liquids then pass through the porous wall 100 and preferably also through an inner wall or lining 105 having cone-shaped delivery passages 106, all as previously described. With this construction, the liquid fuel and liquid oxygen are very effectively mixed and intermingled before delivery to the combustion chamber.

I have also made special provision for cooling the discharge nozzle 110 (Fig. 14) of the combustion chamber. For this purpose I surround the nozzle with an outer jacket 111 and with an intermediate corrugated partition 112 (Fig. 20) having spray openings 112a through the inner points of the corrugations. Cooling water is supplied through a pipe 114 to the space 115 between the jacket 111 and the middle partition 112. The water then passes through the spray openings and engages the outer surface of the nozzle 110, after which it collects in the space 116 between the middle partition 112 and the nozzle 110, from which space 116 the water is discharged through a pipe 118. Very effective cooling of the nozzle 110 is thus provided. For a high temperature of the discharge nozzle 110, an increased amount of heat will be removed by allowing a part of the water to be converted into steam.

A combustion chamber constructed as disclosed in Figs. 14 to 19 has many substantial advantages. The method of construction, using a large number of lune-shaped elements closely abutting as shown in Fig. 15, provides a very strongly braced and rigid construction and one in which the inner surfaces of the lune-shaped elements are effectively liquid cooled, as the curved inner edges of the elements cause these edge portions to be closely engaged by the liquid fuel and liquid oxygen by reason of centrifugal force.

Furthermore, when two liquids such as propane and oxygen are used which are both very cold and approximately of the same temperature, neither liquid will disturb the combustion process by freezing the other.

The pipes 82 (Fig. 15) for introducing liquid nitrogen through either the fuel or the oxygen supply pipe are made use of during the starting or stopping of combustion in the chamber, at which time the nitrogen is introduced to thin the mixture and to thus greatly reduce the danger of explosion.

The specific construction of the jacketed discharge nozzle is not claimed herein but forms the subject matter of a divisional application Serial No. 670,728, filed May 18, 1946.

Having thus described my invention and the advantages thereof, I do not wish to be limited to the details herein disclosed, otherwise than as set forth in the claims, but what I claim is:

1. In a combustion chamber, a wall portion effective to promote intermingling of combustion liquids therein and also effective as a safety screen to prevent flash-back of said liquids, said wall comprising a multiplicity of small heat-conductive metal fragments sintered together to provide a channeled and porous structure, and a hollow double-walled plate embedded in said structure and having open passages therethrough and feed openings for one of said intermingling combustion liquids from the hollow interior of said plate.

2. In a combustion chamber, a wall portion effective to promote intermingling of combustion liquids therein and also effective as a safety screen to prevent flash-back of said liquids, said wall comprising a multiplicity of small heat-conductive metal fragments sintered together to provide a channeled and porous structure, and a hollow double-walled plate embedded in said structure and having open passages therethrough and feed openings for one of said intermingling combustion liquids from the hollow interior thereof of said plate, said feed openings being only in the side wall of said plate disposed nearer the interior of the combustion chamber.

3. In a combustion chamber, an outer recessed wall portion for liquid oxygen, an inwardly adjacent recessed wall portion for liquid fuel, means to feed said liquids inward from said recessed portions, a channeled and porous wall within said recessed portion and in which said liquids are intermingled, and a lining within said porous wall having passages through which the mixed liquids are delivered to the combustion chamber.

4. The combination in a combustion chamber as set forth in claim 3, in which the passages in the lining are gradually contracted in the direction of liquid flow.

5. The combination in a combustion chamber as set forth in claim 3, in which each lining passage is substantially perpendicular to the inner wall of the combustion chamber at its point of entry thereto.

6. The combination in a combustion chamber as set forth in claim 3, in which the lining is formed of metal having good heat-conductive properties.

7. The combination in a combustion chamber as set forth in claim 3, in which the lining is formed of metal having good heat-conductive properties and in which a heat-resistant facing is provided for said lining.

8. The combination in a combustion chamber as set forth in claim 3, in which the lining is formed of metal having good heat-conductive properties and in which a heat-resistant facing is provided for said lining and is dove-tailed and rabbeted thereto.

9. The combination in a combustion chamber as set forth in claim 3, in which the channeled and porous wall is formed of metal having good heat-conductive properties.

10. The combination in a combustion chamber as set forth in claim 3, in which the channeled and porous wall is formed of small metal fragments sintered together.

11. The combination in a combustion chamber as set forth in claim 3, in which an open mixing space is provided between the inner recessed wall portion and the channeled and porous wall.

12. In a combustion chamber, an outer recessed wall portion for liquid oxygen, an inwardly adjacent recessed wall portion for liquid fuel, means to feed said liquids inward from said recessed portions, a channeled and porous wall within said recessed portion to which said liquids are fed and in which said liquids are intermingled, a lining within said porous wall having passages through which the mixed liquids are delivered to the combustion chamber, and means to add additional oxygen to the mixture before delivery through said lining.

13. In a combustion chamber, a casing comprising a plurality of circumferentially-assembled lune-shaped elements each having separate compartments to receive liquid fuel and liquid oxygen respectively.

14. In a combustion chamber, a casing comprising a plurality of circumferentially-assembled lune-shaped elements each having separate compartments to receive liquid fuel and liquid oxygen respectively, and said compartments being provided with feed openings for delivery of said liquids toward said chamber in intersecting sprays.

15. In a combustion chamber, a casing comprising a plurality of circumferentially-assembled lune-shaped elements each having separate compartments to receive liquid fuel and liquid oxygen respectively, and said compartments being provided with parallel longitudinally extending slits through which said liquids are delivered for intermingling and combustion.

16. In a combustion chamber, a casing comprising a plurality of circumferentially-assembled lune-shaped elements each having separate compartments to receive liquid fuel and liquid oxygen respectively, and a pair of chamber-encircling feed pipes for said liquid fuel and said liquid oxygen respectively, which pipes are connected respectively to circumferentially alternate compartments in said lune-shaped elements.

17. In a combustion chamber, a casing comprising a plurality of alternately disposed and circumferentially adjacent lune-shaped compartments to receive liquid fuel and liquid oxygen respectively, and a pair of chamber-encircling closed-end feed pipes for said liquid fuel and said liquid oxygen respectively, said pipes being connected to alternate compartments and being progressively reduced in diameter around said chamber and toward the end of each pipe.

ROBERT H. GODDARD.